Jan. 19, 1954   M. CASA-MASSA   2,666,343
DIFFERENTIAL MECHANISM

Filed Sept. 20, 1948                    3 Sheets—Sheet 1

INVENTOR.
MARIO CASA-MASSA
BY
ATTORNEY

INVENTOR.
MARIO CASA-MASSA

ATTORNEY

INVENTOR.
MARIO CASA-MASSA
BY Irving H. Goodfriend
ATTORNEY

Patented Jan. 19, 1954

2,666,343

UNITED STATES PATENT OFFICE 2,666,343

DIFFERENTIAL MECHANISM

Mario Casa-Massa, New York, N. Y.

Application September 20, 1948, Serial No. 50,162

7 Claims. (Cl. 74—715)

The present invention relates to a differential mechanism, for example, such as that provided in a motor car between the propeller or driving shaft and the final drive, which is connected to the wheel axes, which wheel axes are normally disposed at right angles to the power transmission shaft, although it is to be understood that the present differential mechanism may be applied to many uses other than in the automotive field because of the unusual functioning and results obtained.

Automotive differentials are used to divide equally between the driving wheels, the effort supplied by the car motor and at the same time allow one wheel to over-run the other wheel when the car makes a turn on the road. That is, provision is made for differentiating as to speed between the wheel axes. This has been normally accomplished by means of a combination of bevel gears.

However, serious disadvantages have been encountered with the conventional automotive differential. This happens when one of the rear or driven wheels loses traction, as when it starts to slip on ice, a wet surface, deep sand, mud and the like. Under such circumstances, this wheel without traction spins sometimes at great speed, but the other wheel, since it grips, will stand still and no motion is given to the vehicle. To put it another way, conventional differentials give the most power to the wheel having the least traction and the least power to the wheel having the most traction, the latter being where the greatest power should be given.

This failure to differentiate as to power, that is, giving to the wheel which has traction sufficient power to cause it to turn and simultaneously giving little power to the wheel that has no traction has resulted in serious accidents, even disregarding the failure to start the vehicle on ice, in mud or sand.

As a result, this described disadvantage of failure to differentiate as to power has resulted in the overturning of racing cars, tractors and other failures in these and the military field.

In the past, many efforts have been made to overcome the difficulty arising from differences in wheel traction by attempting to introduce, when required, internal friction or locks or wedges. This in effect makes the wheel axes act as a solid drive. Such locking or wedging differentials are subject to relatively excessive wear, frequent breakage under the comparatively heavy service to which they are subjected and for which they have been designed and to frequent breakdowns because they contained extraneous parts that are thrown in or out of the mechanism as the demands for a lock or wedge are made by one wheel or the other.

The present invention therefore, contemplates the provision of a differential in which the control and differentiating gears have a variable, selective hold, as distinguished from a lock, which hold automatically changes with the demands made upon it by each wheel of the vehicle. Such variable selective hold is a characteristic of the gears comprising the control and differentiating gear, which are in accordance with the method and formula herein described, which method and formula have up to the present escaped the workers in this field.

The present invention contemplates the provision of a relatively simple differential mechanism that comprises comparatively few parts, in which the gears are in straight entrainment and constant mesh and which distributes power and torque equally to both wheels when the traction and the wheel speed are equal. The differential mechanism here contemplated, however, when the traction on one wheel decreases below the holding point between the control and differentiating gears of my mechanism, delivers power mainly to the other wheel. Thus, with the differential here contemplated, without the necessity of a locking or wedging mechanism, the wheel that has no traction will nevertheless not slip since a minimum of power is automatically delivered to it.

Therefore, the vehicle equipped with a differential mechanism here contemplated and having control and differentiating gearing designed in accordance with the method here proposed, not only differentiates as to speed with complete freedom in its own radius but also automatically differentiates with respect to power requirements, giving to the wheel having traction the major proportion of the power generated by the power plant, where the power is required, and little power to the wheel having little or no traction, without resorting to a wedging or locking interposition in the gearing. A vehicle equipped with the differential mechanism here contemplated will not skid or overturn and both rear wheels will drive irrespective of the surface condition on which the vehicle moves.

The solution of the problem here presented has also in the past been sought in the provision of a differential mechanism using worm and helical gears.

I have found that in a helical gear the resistance to its rotation is the rolling friction and the sliding friction. Since the point of contact continuously moves across the face of the gear teeth, static friction is therefore for practical purposes negligible and only the kinetic friction between the gears should be considered.

In the mechanism here contemplated, which has provided a control gear and differentiating gears, there is a resistance to rotation of the control gear exerted between it and the differentiating gearing, which I call a holding or control action. For a given load, this resistance to rotation is a function of the helix angle.

By the term load is meant, the thrust on the gear teeth, which thrust is related to the difference of the load on the automobile wheel, for example, if both wheels rotate at the same speed there will be no thrust.

In the discussion throughout the specification it will be assumed that the differentiating gears and the control gears are mounted with their axes at ninety degrees to each other. In such case the helix angle is forty five degrees for a fully reversible drive. If the axes of the helical gears are at an angle other than ninety degrees, the helix angle for a fully reversible drive should be considered as half the angle formed by the two axes, and this angle should then be used as a reference, instead of the forty five degree angle, in determining the helix angle of the gears necessary to attain the desired result as hereinafter set forth.

Since with a forty five degree helical angle, the holding action for rotation on the differentiating gear and the control gear will be the same in either direction, I propose using these characteristics in the design of the differential mechanism now proposed. Therefore, in the practice of my invention, I determine the angle of the control and differentiating gears from the critical kinetic friction angle for the material selected for the gears and the lubricant to be used and the selected surface condition to thereby provide between them a selective holding action so that the gear connected to the wheel having traction is locked and the gear connected to the wheel having no traction will not be held but will slip.

The manner in which such selective holding action is determined, among other things, provides the successful functioning of the present invention.

The present application is an improvement to my application Ser. No. 408,748, filed on August 29, 1941, for Differential Mechanism, which application was abandoned, and to my application Ser. No. 562,938, filed on November 11, 1944 for Differential Mechanism and which latter application was also abandoned and is common to the elements of construction disclosed in these applications.

The above enumerated and other objects and advantages of the present invention will be clear from the description which follows and the drawings appended thereto, setting forth illustrative examples of the present invention such as automobile differentials, though of course my invention may be applied to locomotives, tricycles and many other industrial power devices and in which drawings.

Figure 1:
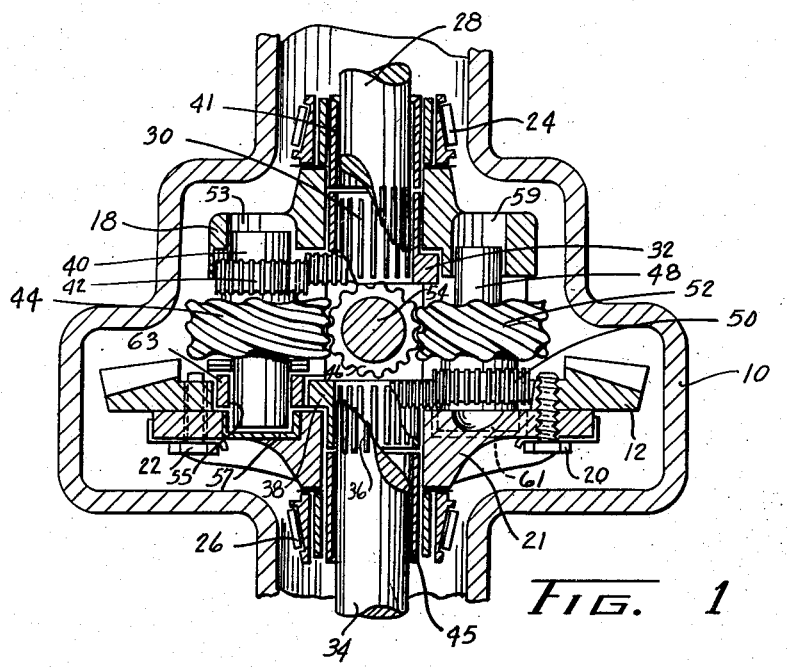
Fig. 1 is a transverse cross section through an automotive differential having differential mechanism embodying my invention.
Figure 2:
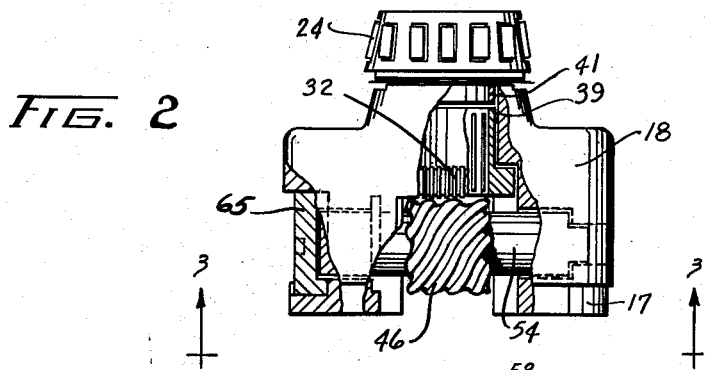
Fig. 2 is a plan view partially broken away of the housing or cage for the differential mechanism.
Figure 3:
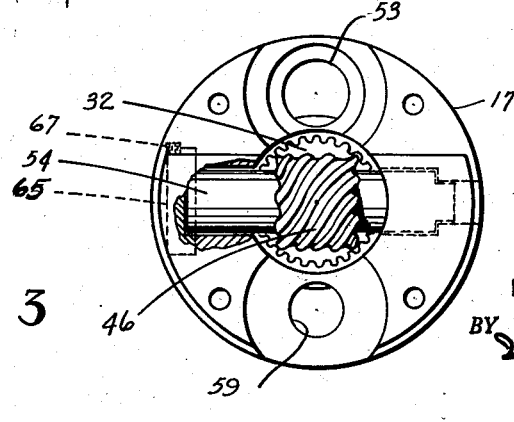
Fig. 3 is a view on the line 3—3 of Fig. 2.

Referring now to the drawings and more particularly to Figs. 1 to 4, in which I illustrate a preferred embodiment of my invention, to which modification I arbitrarily refer to as a three gear arrangement and in which I use one control gear and two differentiating gears, the differential mechanism according to the present invention is mounted in the rear automobile differential housing 10.

As in the conventional automobile, the ring gear 12 is operatively driven by a driving pinion (not shown) mounted on the rear end of the drive shaft.

The lower part 17 of the housing or cage 18, in which the differential gearing according to my invention is housed, is seated in a corresponding recess in the ring gear 12 for rotation thereby. As will be pointed out, this ring gear 12 is secured to the bracket 21, to which reference will hereafter be made, as by the retaining screws 20 and 22, which of course if desired may be nuts and bolts.

One end of the cage 18 is journaled in the housing 10 in a conventional manner, as by the roller bearing 24 and the bracket 21 is secured in the housing as by the roller bearing 26.

The wheel axle 28 is secured by means of the internal spline 30 to the spur gear 32. The other wheel axle 34 is secured by means of the internal spline 36 to the spur gear 38.

The wheel axle 28 extends through an opening in the upper end 39 of the cage or housing 18 and is journaled in the bushing 41. The wheel axle 34 extends through an opening in the bracket 21 which is secured, as stated, to the ring gear 12, and which bracket carries the bushing 45 in which the shaft 34 is journaled.

Thus, the differential mechanism of my invention is rotated on the bearings 24 and 26 and concurrently the wheel axles 28 and 34 rotate in the bushings 41 and 45.

The countershaft 40, through which the wheel axle 28 is driven, is mounted for rotation in the cage 18 and has secured thereon the driving spur gear 42, which meshes with the spur gear 32 to drive it and the wheel axle 28 and the differentiating gear 44, which differentiating gear meshes with the control gear 46.

The functioning of the differentiating gear and the control gear, which are helical gears, and the method of the choice of the angles thereof and construction, by means of which the novel and unusual differentiation is obtained, will be described in greater detail hereinbelow.

The other countershaft 48, through which the other wheel axle 34 is driven, is also mounted for rotation in the cage 18 and has secured thereon the driving spur gear 50, which meshes with the spur gear 38, and the differentiating gear 52 which also meshes with the control gear 46.

One end of the countershaft 40 is journaled in a recess 53 in the upper end of cage 18, and the other end of this countershaft extends through an opening 55 in the plate 63 in the end 17 of the cage 18 into the recessed bushing 57 in the bracket 21.

One end of the countershaft 48 is journaled in the recess 59 in the cage 18 and the other end in the bearing 61 in the bracket 21. In order to permit assembly adjustment of the shaft 48, I seat in the cage 18 in the lower end 17 thereof the plate 63.

For an understanding of the theory of operation of a differential mechanism constructed pursuant to my invention, the two differentiating functions performed by it, namely the differentiation of speed between the two wheels and the differentiation as to power requirements, when one wheel is under traction and the other under less or no traction, should be considered.

When the vehicle is operating normally, that is when both rear wheels are driven at the same speed, for example when it is moving along a straight path, the differentiating gears 44 and 52 do not rotate in relation to each other. Thus, the ring gear 12 rotates the rear carrier or cage 18, which through the gears 42 and 32 and 50 and 38 drives each wheel axle 28 and 34 equally, that is at the same speed.

However, when there is a speed differential between the two wheels, as when the vehicle is making a turn and assuming that the torque requirements are the same, as when the resistance on each wheel is equal, the differentiating gears 44 and 52 rotate to make up the difference in speed. Thus, if the wheel on shaft 28 is the outer wheel of the vehicle, shaft 28 must rotate at a speed greater than does shaft 34 and therefore differentiating gear 44 rotates at a greater speed than does the differentiating gear 52. Since both gears are mounted in the cage or casing 18, which is driven by the ring gear 12, the speed of the differentiating gears is relevant.

Thus, as in conventional differential mechanisms, the additional rotative speed imparted to the axle 28 is in effect subtracted from the speed imparted to the axle 34 by the rotation of the housing 18 through the differentiating gears 44 and 52 meshing with control gear 46, the shaft 54 of which is housed for rotation in the cage 18. The plane in which the longitudinal axis of the shaft 54 lies is arranged at right angles to the planes in which the longitudinal axes of the countershafts 40 and 48 lie, the shaft 54 being located equi-distantly between the shafts 40 and 48.

To put it another way, the longitudinal axes of the shafts 40 and 48 are perpendicular to the plane of rotation of the ring gear 12 and the longitudinal axis of the shaft 54 is parallel to the plane of rotation of the rear gear. That is, the axes of rotation of the differentiating gear are perpendicular to the axis of rotation to the control gear.

The shaft 54 is mounted for rotation in recesses in the sides of the cage 18, the plug 65 being set in one side of the cage and held therein by the screw 67 to permit insertion and removal of the shaft. The sides of the cage 18 are open to permit the differentiating gears 44 and 52 to extend out therefrom, as seen in Fig. 1.

By my present design and method of determining the angles of the teeth on the differentiating gears 44 and 52 and the control gear 46, which are helical gears, there can now be provided a differential mechanism which satisfactorily meets the conditions arising when the torque on either wheel is unequal due to the conditions, whatever the cause, of the surface on which the vehicle is supported. With a differential mechanism constructed according to my invention, the greatest thrust will automatically be imparted to the axle having the largest load and simultaneously a smaller torque (thrust) will be imparted to the axle having the smaller load.

When the torque is unequal, the axle having the heaviest load increases the thrust on the teeth of the differentiating gear mounted on the corresponding countershaft. This makes the kinetic friction between that differentiating gear and the meshing control gear greater than the kinetic friction for the differentiating gear of the other wheel axle and the control gear.

Utilization of this characteristic, among other things, has escaped the attention of workers in the field, whose proposed differentials have failed to function in the manner of my present differential and therefore have been unsuccessful in meeting the problem, which I now solve.

I propose using such kinetic friction on the gear teeth as a means for controlling the action of the proposed differential mechanism, the gears of which, as will be seen move relatively slowly. Thus, all factors that affect the kinetic friction of the gear teeth affect the control action and are to be taken into consideration when choosing the helix angle of the differentiating gears and the control gear.

Thus, the differentiating gear with the least resistance is driven more easily by the cage 18 through the control gear 46 than is the differentiating gear with the greater resistance. There is therefore provided a selective locking or holding action that imparts to the wheel requiring it the greater torque, without the heretofore wedging or locking devices used.

The effect provided by my differential is a direct function of the helix angle of the differentiating gears and control gear. When the helix angle, for example is forty-five degrees, either differentiating gear may be driven by an equal force, thus providing a reversible drive. However, in this case, the kinetic friction from the axle torque is so high that a thrust is created which exceeds the strength of the gear teeth causing them to break or strip off.

On the other hand, when the drive is completely irreversible, as in a worm and gear, the same condition occurs, but the direction of the irreversibility determines whether failure is caused by the torque of the axle or the torque put on the ring gear.

The present differential is semi-reversible, due to the angle of the control gear and the complementary angle of the differentiating gears, an actual example of which I shall give herein.

This semi-irreversibility is in favor of the axles, by which I mean that the axle through its gears can move the control gear more easily than the control gear can move the axle, although, it is to be recognized that the control gear may move the axle without solidly locking it. This control varies directly with the torque difference between the axles.

To recapitulate, with a helical gear, when it starts to rotate, the resistance to rotation is the rolling friction and the sliding friction, the gear rotating about a point of contact, which point of contact continuously moves across the face of the gear teeth. In such case in determining the angles of the control gear helix and the differentiating gear helix, static friction, since it is negligible, may be disregarded and only the kinetic friction between the gears will be considered.

A resistance to rotation of the control gear is exerted between the control gear and the differentiating gearing, which I name a holding or control action.

For a given load, resistance to rotation of the control gear is a function of the control gear and the differentiating gear and by load I mean the thrust on the gear teeth.

This thrust on the gear teeth is related to the difference of the load on the automobile wheel, for example, if both wheels rotate at the same speed, there will be no thrust.

With a forty five degree angle of the helix of both the control gear and the differentiating gear, where these gears are mounted with their axes at ninety degrees to each other, the holding action for rotation in either direction on both gears, that is the control gear and the differentiating gear, will be the same. It should be recognized that reference is not made to the magnitude of the holding action but only that irrespective of whatever the magnitude of the force may be, it will be equal in either direction.

Recognizing this, I determine the complementary helical angle of the control and differentiating gears, as follows, a method which, among other things such as the construction and the gear teeth ratios, provides the unusual results accomplished by my differential mechanism.

For a selected lubricant, which is to be used with my differential mechanism, a selected surface condition of the gears and for a selected material from which the gears are made, I determine the critical kinetic friction angle, which may be found in any standard table, such as that found in Mark's Mechanical Engineer's Handbook. This critical angle is divided in half and the results added to forty five degrees.

Thus, forty five degrees plus one half of the critical friction angle for the lubricant, surface condition and gear material equals the helix angle of the differentiating gear. This gives the theoretically ideal condition which can be varied within practical limits, which are determined by the strength of the gear teeth.

For example, resistance to fracture of the gear teeth, determines within what limits the critical angle may be varied.

The helix angle of the control gear is the complement of the helix angle of the differentiating gear. For example, in a differential mechanism that I have tested in a conventional stock automobile, I determined by this method that a differential mechanism having differentiating gears, the helix angle of which was forty seven degrees, forty three minutes and a control gear having a helix angle of forty two degrees, seventeen minutes performed in the manner contemplated herein.

As stated, at forty five degrees, there is no selective holding action because the resistance to rotation is the same in both directions for a selected load. However, as the helix angle is varied away from forty five degrees, the resistance to rotation in one direction becomes less than the resistance to rotation in the opposite direction.

Thus, in a differential mechanism having a differentiating gearing and control gear selected according to my invention, if the free wheel is ever so slightly held, the locked wheel receives the percentage of power determined by the helix angle and the relative gear ratios.

To sum up, the critical friction angle determines the selective holding action at the gear, which can be magnified or reduced at the rear by changing the gear ratios within the limits of design, that is, size and strength.

In the practice of my invention, the maximum foot pounds of torque in low gear is derived from the motor power. This torque can be assumed to be equally divided between the two wheel axles of the vehicle. This torque is reduced to pounds of thrust on the control and differentiating gear teeth that are in mesh by taking into consideration the relative lever arms as represented by the pitch radius of the gears involved.

This thrust in pounds is reduced to a median or average thrust, which is assumed to be the thrust which will be most widely used during the operation of the differential. The maximum thrust is used to determine the size and strength of the gear teeth and the median or average thrust is used in the determination of the working helical angle. Using this median thrust, published tables of sliding friction give the critical friction angle for the material to be used, which critical angle of sliding friction is used to determine the helical angles for the differentiating gears and the control gear as previously described.

On that practical embodiment of my invention illustrated the axle gears 32 and 38 are each provided with thirty one teeth and the intermediate gears 42 and 50, which may be considered the weakest in the design, are provided with twenty teeth. The differentiating gears 44 and 52 are provided with twelve teeth and the control gear 46 with which they mesh is provided with nine teeth.

These ratios which are roughly three to two and four to three may be considered critical, and, where two differentiating and one control gears are used, should be provided for very best results. The gear ratio determines the pressure between the teeth of the differentiating and control gears. If the gear ratio is changed the tooth pressures are changed, and, accordingly, the critical angle of friction is changed.

Such arrangement assures that the wheel with least road resistance will receive a minimum of six per cent of the power input, the balance being received by the wheel having the greatest road resistance.

Should the first ratio, that is wheel gear to intermediate gear, be changed to two to one the thrust of the axle on the control gear would be decreased proportionately, reducing the six per cent minimum to about four per cent. This control percentage, however, could be increased to the original magnitude by making the helix angle on the control gear 46 greater, the converse also being true.

The reason for this is that the kinetic friction varies as the load bearing on the surface under consideration.

A differential mechanism according to my invention, will make it possible to move the automobile even though one wheel is on a slippery support, such as a wet pavement or slippery ice, and the other wheel does not slip, since that wheel having traction receives the power and that wheel without traction receives little power, a function not heretofore accomplished by conventional differentials or unless the differential is provided with a locking or wedging means.

Further, my differential mechanism in actual practice reduces or retards the rotary acceleration of a wheel should it leave the supporting surface thus greatly reducing the spinning and scuffing of the wheels where the vehicle travels over rough surface.

In addition, this selective holding action between the control gear and the differentiating gear reduces the tendency of the car to skid, particularly when it travels over patchy surfaces.

With my differential, a tractive force sufficient at least to move the car, is at all times provided.

The three gear differential just described is preferable for ordinary loads met in passenger car and trucking conditions. Whether a three gear arrangement is to be used, an eight gear arrangement such as illustrated in Figs. 5 to 7 or otherwise, is determined by the power transmitted through the ring and pinion and the space limitations in which the differential is to be mounted.

Figure 4:
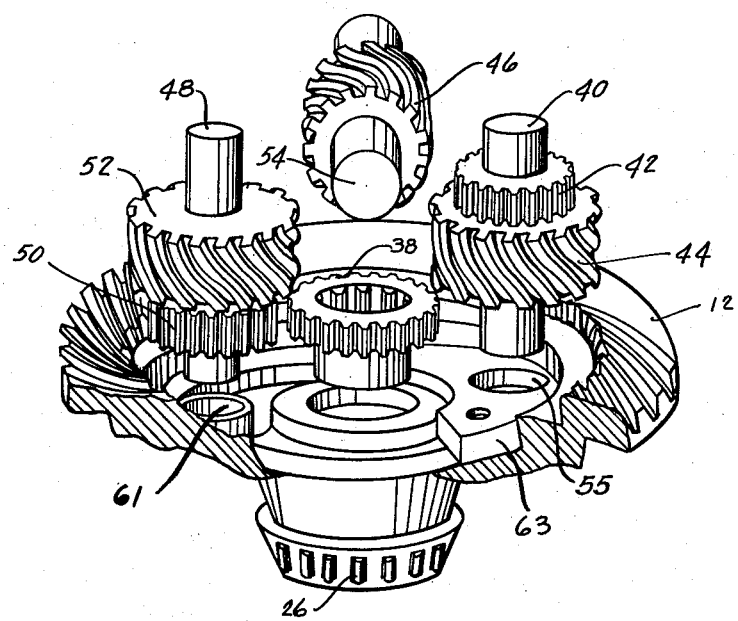
Fig. 4 is an exploded view of the control gear and the differentiating gears of the differential mechanism and the ring gear which operates them.
Figure 5:
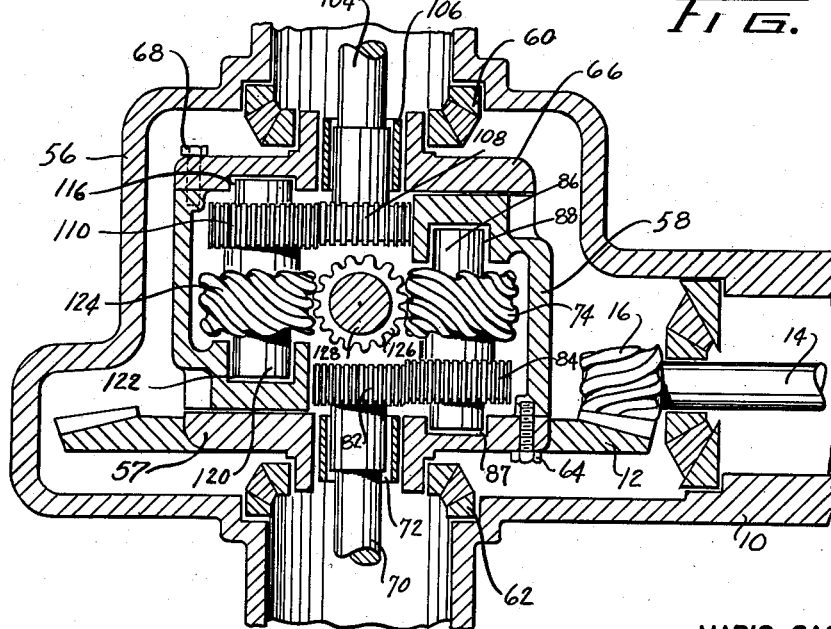
Fig. 5 is a cross section on the line 5—5 of Fig. 6, illustrating a modified form of differential mechanism according to my invention.
Figure 6:
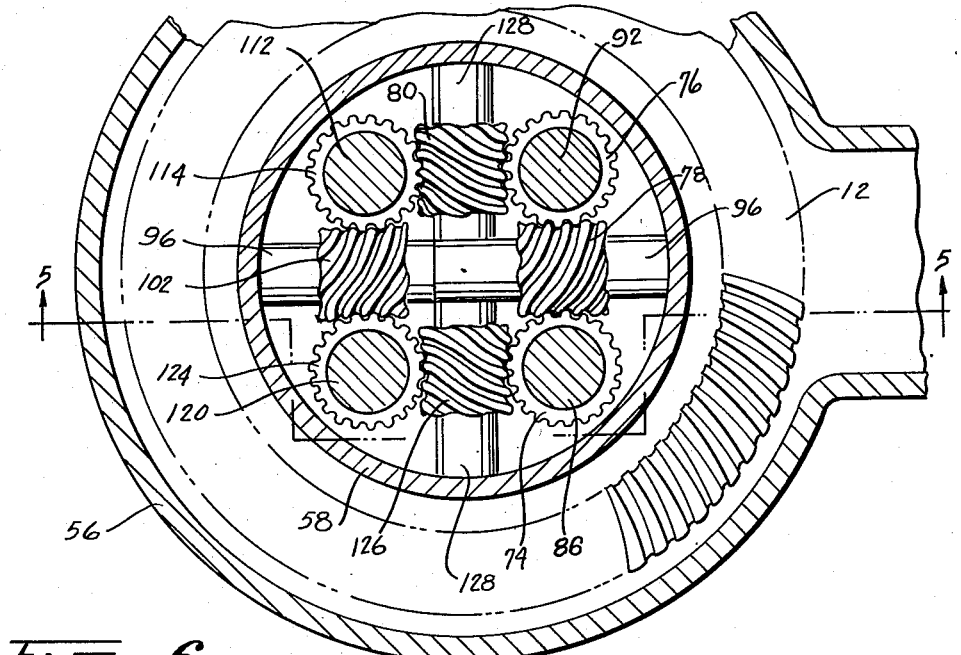
Fig. 6 is a lateral section through said modified form of my invention.
Figure 7:
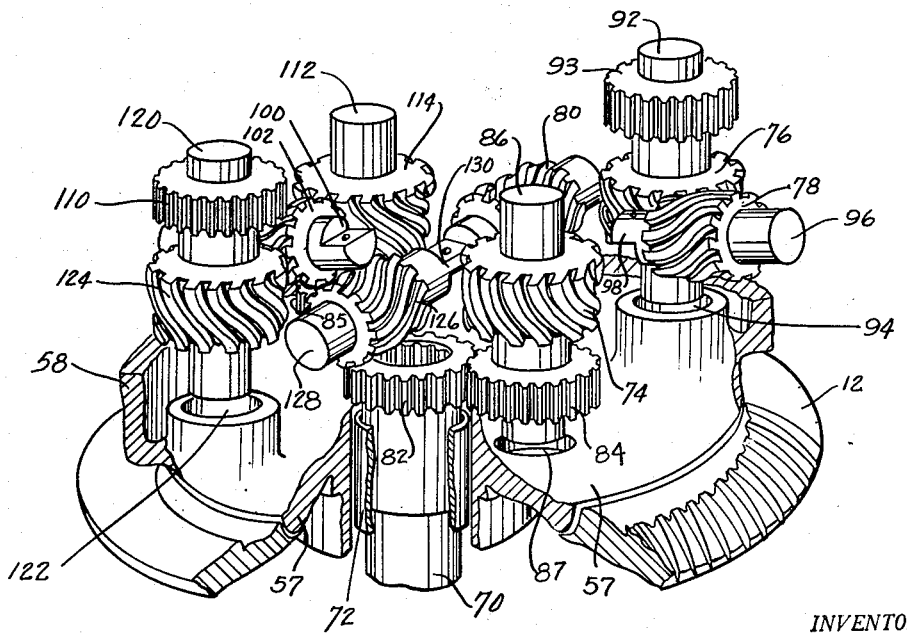
Fig. 7 is an exploded view thereof similar to Fig. 4.

Referring now to Figs. 5 to 7 inclusive, I have there illustrated a modification of my differential that may be used where additional strength is desired for a heavy duty vehicle, such as a truck or tractor, although it will be understood that the differential mechanism illustrated in Figs. 1 to 4, if satisfactorily calculated, may be used for heavy duty.

Fundamentally a differential mechanism, according to my invention, is provided with two differentiating gears to each control gear. For example, the preferred arrangement is the three gear arrangement illustrated in Figs. 1 to 4. Where, for greater strength, more gears are desired, the next arrangement would be a six gear arrangement, that is four differentiating gears to two control gears.

However, I have found that it may be more satisfactory in such arrangement to use in addition two more intermeshing control gears, such as the eight gear arrangement illustrated in Figs. 5 to 7. Such arrangement is possible because the rotation of the adjacent differentiating gear is in an opposite direction and therefore will permit the introduction of the additional intermeshing gears.

Thus the advantages of a two to one ratio of differentiating gears to control gears is in effect utilized but with smaller and lighter gears without sacrificing strength because with the eight gear arrangement the force is distributed throughout a larger number of teeth.

Referring now to Figs. 5 to 7, my differential mechanism is mounted in the rear casing 56 in which the differential cage 58 is rotatably supported on the conventional roller bearings 60 and 62.

The lower plate 57 of the cage 58 is seated in a corresponding recess in the ring gear 12. The cage 58 is secured to the part 57 as by means of the retaining screw 64.

The cage 58 in which my modified differential mechanism is housed is closed by the cover or end plate 66 as by the screw 68.

Referring now to the exploded isometric view, Fig. 7, the wheel shaft 70 mounted for rotation in the bushing 72 carried by the cage 58 is controlled by the two differentiating gears 74 and 76 and the two intermeshing idler or control gears 78 and 80.

It will of course be understood that the differentiating gears and control gears of the modification illustrated in Figs. 5 to 7 are helical gears having helix angles determined by the method heretofore described with reference to Figs. 1 to 4.

The wheel shaft 70 has secured thereon the driven spur gear 82 which meshes with the driving spur gear 84 on one of the countershafts 86, one end of which is seated in a recess 87 in the part 57 and the other end of which is mounted in the recess 88 of the cage 58.

One end of the other countershaft 92 which also is utilized to control the speed of rotation at which the wheel shaft 70 is operated and the proportion of power which will be transmitted thereto, is mounted in the recess bearing 94 of the cage 58. The other end of the countershaft 92 (not shown) is seated in a recess in the end or cover plate 66.

The differentiating gear 76 is carried by the second countershaft 92 and meshes with the control gear 78, which in turn meshes with the differentiating gear 74 on the countershaft 86.

The idler or control gear 78 is carried on the shaft 96, positioned between the countershafts 86 and 92, which shaft 96 is undercut at 98 to dovetail on the undercut 100 on the portion of the shaft 96 on which the control or idler gear 102 is carried and to which it is secured.

The other wheel shaft 104 is mounted in the bushing 106 in the end or cover plate 66, which cover plate is mounted in the differential housing 56 on the roller bearings 60.

The wheel shaft 104 has mounted thereon the driven spur gear 108 which meshes with the driving spur gear 110 on the countershaft 120 and the spur gear 93 on the diagonally opposite countershaft 92.

On the countershaft 112, I mount one of the differentiating gears 114, which meshes with the idler or control gear 102 and the idler or control gear 80.

One end of the countershaft 112 is seated in a bearing recess in the cage 58 (not shown but which is similar to recess 87) and the other end in a recess in the end or cover plate 66, (not shown but which is similar to recess 88).

One end of the other countershaft 120, which also is utilized to control the speed of rotation at which the wheel axle 104 is operated and the proportion of power which will be transmitted thereto, is mounted in the recess bearing 122 in the cage 58. The other end of this countershaft is mounted in recess 116, in the cover or end plate 66.

The differentiating gear 124 is mounted on this other countershaft 120 and meshes with control or idler gear 102 on the shaft 96 and the control or idler gear 126 mounted on the cross shaft 128 on which the control or idler gear 80 is also mounted.

It will of course be understood that the countershafts are so mounted in the cage 58 that the various spur gears heretofore mentioned are located so that they will mesh together.

Both idler or control gear shaft 96 and the idler or control gear cross shaft 128 are mounted for rotation in the cage 58 (see Fig. 6). As illustrated in Fig. 7, the cross shaft 128 is undercut at 130 to permit the positioning of the shaft 96 above the cross shaft 128 upon the assembly of the mechanism.

It is to be noted that as with the modification illustrated in Figs. 1 and 4, the countershafts on which the differentiating gears are carried, are positioned at right angles to the plane of rotation of the ring gear 12. To put it another way, these countershafts are parallel to the axis of rotation of the differential mechanism cage 58 and equally spaced radially thereabout.

Similarly the shaft 96, on which the idler or control gears 78 and 102 are carried and the cross shaft 128, on which the idler or control gears 80 and 126 are carried, lie in a plane that is parallel to the plane of rotation of the ring gear 12 or to the direction of rotation of the cage 58.

Each pair of differentiating gears has interposed therebetween a control or idler gear with which it meshes, the shaft on which the idler or control gear is carried being perpendicular to the shafts on which the differentiating gears intermeshing therewith are carried. For example, the differentiating gears 74 and 75 mesh with the control gear 78, the differentiating gears 76 and 114 mesh with the control gears 80, the differentiating gears 114 and 124 mesh with the control gear 102 and the differentiating gears 124 and 74 mesh with the control gear 126.

In the embodiment illustrated in Figs. 5 to 7 inclusive, just as in the embodiment illustrated in Figs. 1 to 4 inclusive, the additional rotative speed imparted to one wheel axle because of the differentiating gears and control gears, is in effect subtracted from the speed imparted to the other wheel axle by the rotation of the cage or housing which is secured to the ring gear.

The helix angles of the intermeshing differentiating gears and control gears of the embodiment illustrated in Figs. 5 to 7 inclusive are chosen in the same manner so that the differentiating gears, either the set thereof comprised by the gears 74 and 76, or the set thereof comprised by the gears 114 and 124, are driven more easily by the cage 58 respectively through the control gears 78 and 102, the control gears 80 and 126 merely constituting counter intermeshing control gears. There is thus provided the same kind of selective, locking or holding action which imparts to the wheel requiring it more torque and to the wheel that does not require it less torque.

The helical angle of the differentiating gear, as in the first embodiment described, is forty five degrees plus one half of the critical kinetic friction angle for the lubricant used, the surface condition of the gears and the material used for the gears and the helix angle of the control gear is then ninety degrees minus the helical angle of the differentiating gear.

While I have described my invention with reference to an automobile, it will be understood that other vehicles, such as tractors, railway locomotives and tricycles may also utilize my invention and that it may be applied to other uses in which a differential is required through which to supply power to two different shafts.

While I have described in comparative detail certain embodiments of my invention, since modifications thereof may now be made by those skilled in the art, it is to be understood that I do not intend to be limited to the details of the embodiments illustrated but intend to claim my invention as limited only by the scope of the appended claims.

I claim:

1. In a differential mechanism, a pair of helical differentiating gears and a helical control gear between the differentiating gears and in operative mesh therewith, the helical angle of the control gear being forty two degrees and seventeen minutes and the helical angle of the differentiating gears being forty seven degrees and forty three minutes.

2. In a differential, a housing mounted for rotation, power input means for rotating the housing, a pair of driven shafts mounted for rotation in the housing and extending outwardly therefrom on opposite sides of the housing whereby one end of each shaft is located outside of the housing and the other end of each shaft is located within the housing and spaced from each other, the longitudinal axes of the driven shafts being in alignment, a driven gear on each driven shaft and positioned within the housing, a pair of countershafts mounted for rotation in the housing, the longitudinal axes of said countershafts being parallel to the longitudinal axes of the driven shafts, a driving gear on each countershaft meshing with a driven gear on a driven shaft, a helical differentiating gear on each countershaft and located in the housing, a cross shaft mounted for rotation in the housing and positioned between the countershafts and the ends of the driven shafts in the housing, the longitudinal axis of the cross shaft lying in a plane that is perpendicular to the plane in which the longitudinal axes of the countershafts and the driven shafts lie, and a control gear on the cross shaft between the differentiating gears and in operative mesh with each of the differentiating gears, the helical angle of the differentiating gear being forty five degrees plus one-half of the kinetic friction angle for the surfaces of the control and differentiating gears that are in mesh as determined for the conditions of design, and the helical angle of the control gear being ninety degrees minus the said angle of the differentiating gear.

3. In a differential, a housing mounted for rotation, power input means for rotating the housing, a pair of driven shafts mounted for rotation in the housing and extending outwardly therefrom on opposite sides of the housing whereby one end of each shaft is located outside of the housing and the other end of each shaft is located within the housing and spaced from each other, the longitudinal axes of the driven shafts being in alignment, a driven gear on each driven shaft and positioned within the housing, a pair of countershafts mounted for rotation in the housing, the longitudinal axes of said countershafts being parallel to the longitudinal axes of the driven shafts, a driving gear on each countershaft meshing with a driven gear on a driven shaft, a helical differentiating gear on each countershaft and located in the housing, a cross shaft mounted for rotation in the housing and positioned between the countershafts and the ends of the driven shafts in the housing, the longitudinal axis of the cross shaft lying in a plane that is perpendicular to the plane in which the longitudinal axes of the countershafts and the driven shafts lie, and a control gear on the cross shaft between the differentiating gears and in operative mesh with each of the differentiating gears, the helical angle of the differentiating gear being approximately forty seven degrees and forty three minutes, and the helical angle of the control gear being approximately forty two degrees and seventeen minutes.

4. In a differential, a housing mounted for rotation, power input means for rotating the housing, a pair of driven shafts mounted for rotation in the housing and extending outwardly therefrom on opposite sides of the housing whereby one end of each shaft is located outside of the housing and the other end of each shaft is located within the housing and spaced from each other, the longitudinal axes of the driven shafts being in alignment, a driven gear on each driven shaft and positioned within the housing, a pair of countershafts mounted for rotation in the housing, the longitudinal axes of said countershafts being parallel to the longitudinal axes of the driven shafts, a driving gear on each countershaft meshing with a driven gear on a driven shaft, a helical differentiating gear on each countershaft and located in the housing, a cross shaft mounted for rotation in the housing and positioned between the countershafts and the ends of the driven shafts in the housing, the longitudinal axis of the cross shaft lying in a plane that extends at an angle to the plane in which the longitudinal axes of the countershafts and the driven shafts lie, and a control gear on the cross shaft between the differentiating gears and in operative mesh with each of the differentiating gears, the helical angle of the differentiating gear being greater than one-half the angle between the shafts on which the differentiating gear and the control gear are mounted, and the helical angle of the control gear being equal to the angle between the shafts on which the differentiating gear and the control gear are mounted minus the said helical angle of the differentiating gear.

5. In a differential, a housing mounted for rotation, power input means for rotating the housing, a pair of driven shafts mounted for rotation in the housing and extending outwardly therefrom on opposite sides of the housing whereby one end of each shaft is located outside of the housing and the other end of each shaft is located within the housing and spaced from each other, the longitudinal axes of the driven shafts being in alignment, a driven gear on each driven shaft and positioned within the housing, a pair of countershafts mounted for rotation in the housing, the longitudinal axes of said countershafts being parallel to the longitudinal axes of the driven shafts, a driving gear on each countershaft meshing with a driven gear on a driven shaft, a helical differentiating gear on each countershaft and located in the housing, a cross shaft mounted for rotation in the housing and positioned between the countershafts and the ends of the driven shafts in the housing, the longitudinal axis of the cross shaft lying in a plane that extends at an angle to the plane in which the longitudinal axes of the countershafts and the driven shafts lie, and a control gear on the cross shaft between the differentiating gears and in operative mesh with each of the differentiating gears, the helical angle of the differentiating gear being one-half the angle between the shafts on which the differentiating gear and the control gear are mounted, plus one-half of the kinetic friction angle for the surfaces of the control and differentiating gears that are in mesh, and the helical angle of the control gear being equal to the angle between the shafts on which the differentiating and the control gear are mounted minus the said helical angle of the differentiating gear.

6. In a differential mechanism, a helical control gear and a pair of differentiating gears in operative mesh with the control gear on opposite sides thereof, the helical angle of the differentiating gears being forty five degrees plus one-half the critical angle of sliding friction between the surfaces of the control and differentiating gears in mesh with each other, and the helical angle of the control gear being ninety degrees minus the helical angle of the differentiating gears.

7. In a differential mechanism, a helical control gear and a pair of differentiating gears in operative mesh with the control gear on opposite sides thereof, the axes of said control and differentiating gears extending angularly to each other, the helical angle of the differentiating gears being one-half the angle between said axes plus one-half the critical angle of sliding friction between the surfaces of the control and differentiating gears in mesh with each other, and the helical angle of the control gear being the angle between said axes minus the helical angle of the differentiating gears.

MARIO CASA-MASSA.

References Cited in the file of this patent

UNITED STATES PATENTS

| Number | Name | Date |
| --- | --- | --- |
| 1,140,312 | Nogrady | May 18, 1915 |
| 1,164,769 | Walter | Dec. 21, 1915 |
| 1,310,976 | Williams | July 22, 1919 |
| 1,365,756 | Williams | Jan. 18, 1921 |
| 2,022,141 | Morgan | Nov. 26, 1935 |
| 2,070,569 | Asam | Feb. 16, 1937 |

FOREIGN PATENTS

| Number | Country | Date |
| --- | --- | --- |
| 768,330 | France | Aug. 3, 1934 |
| 201,805 | Germany | Sept. 18, 1908 |

OTHER REFERENCES

Spiral & Worm Gearing, pages 1 to 4 inclusive, 1st edition—1914, The Industrial Press, New York.